Aug. 24, 1965  H. CLAAS  3,201,928

ROW CROP ATTACHMENT FOR A HARVESTER COMBINE

Filed Sept. 5, 1962  2 Sheets-Sheet 1

INVENTOR.
Helmut Claas
BY
Michael J. Striker

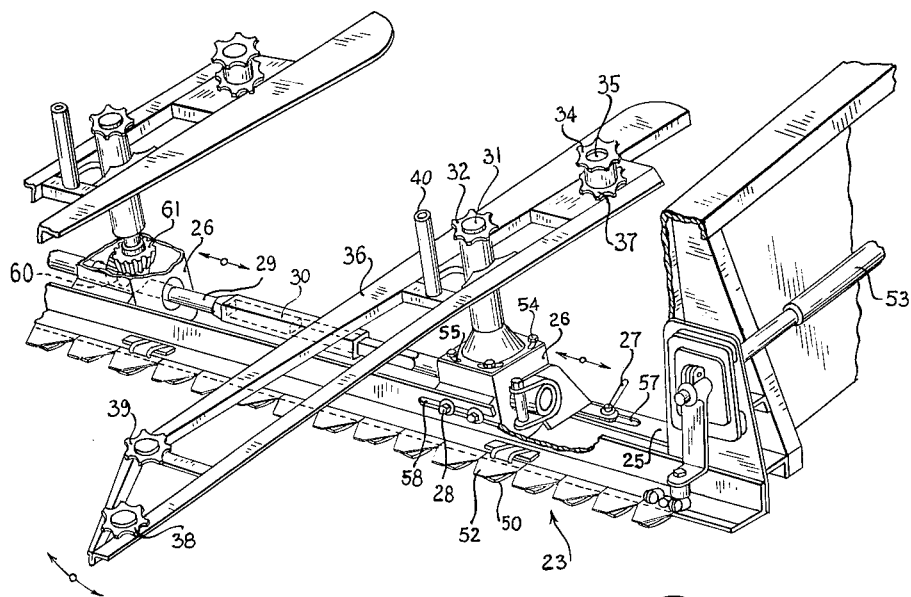
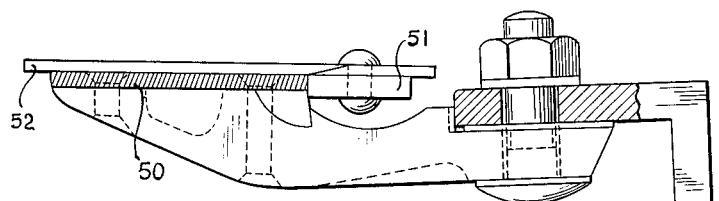
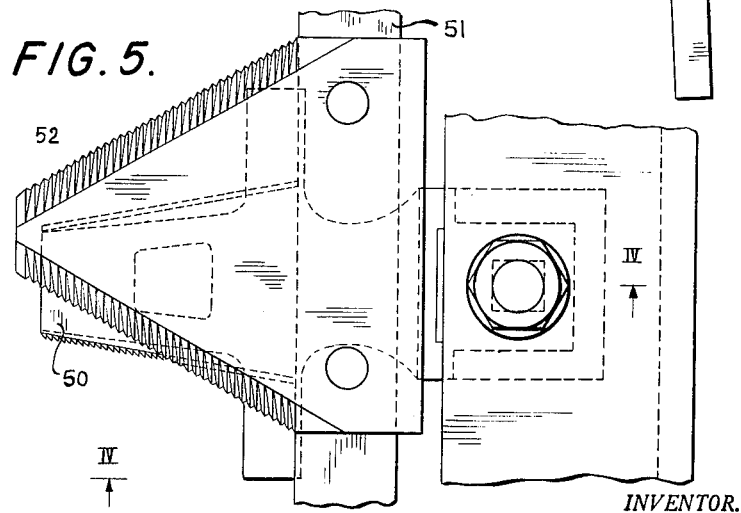
INVENTOR.
BY

# United States Patent Office 3,201,928
Patented Aug. 24, 1965

3,201,928
ROW CROP ATTACHMENT FOR A
HARVESTER COMBINE
Helmut Claas, 4 Am Kattenpatt, Harsewinkel,
Westphalia, Germany
Filed Sept. 5, 1962, Ser. No. 221,582
3 Claims. (Cl. 56—98)

This invention relates to harvester combine mounted harvesting attachments, and more specifically to a harvesting attachment for row-planted crop, such as Indian corn.

Harvesting attachments for Indian corn and the like which can be attached to a harvester combine are known and include, on the one hand, a plurality of substantially trapezoidal plates attachable to the header assembly of the harvester combine and, on the other hand, enlargement members for the laths of the reel. Adjacent plates are arranged to converge from the intake region in the direction opposite to the advancing direction of the harvester combine to define stalk passages and at the same time serve the purpose of intercepting broken-off ears which subsequently are conveyed by the enlarged laths of the reel on to the cutter pan.

Such devices are but of limited practical usefulness as the stalk passages receiving the rows of crop are merely defined by guide surfaces which might deflect the stalks, before these are cut, into positions unsuited for gathering them.

In other known corn harvesters the guide members defining the passages for the rows of crop are equipped with feeding-in chains and it is only through these feeding-in chains that trouble-free operation is ensured. These devices have, however, the disadvantage that they are designed for predetermined row spacing, i.e. can be used for one row spacing only. However, as the row spacing of the crop is selected according to soil and weather conditions and in the case of Indian corn usually varies between 0.7 and 1.0 meter, it becomes obvious that the known corn harvesters are but of restricted practical usefulness and by no means universally employable.

It is the object of the invention to eliminate the aforementioned disadvantages of the known corn harvesting units and to provide a harvesting attachment which is reliable in operation and can be adjusted to the row spacing of the crop.

This object is achieved according to the present invention by the provision of a harvester combine mounted harvesting attachment for row-planted crop, especially Indian corn, which comprises a cutting mechanism, guide members for the cut crop adjustable to the row spacing of the crop and converging in a direction opposite to the advancing direction of the harvester combine so as to define a plurality of stalk passages, chain type conveying means mounted on said guide members, and driving means associated with said chain type conveying means and including elements which are readily adaptable to the respective adjusted positions of said guide members.

The advantages of this harvesting attachment over the known constructions result from the constructional features that, on the one hand, the guide members and thus the stalk passages thereby defined are adjustable to the actual row spacing of the crop to be harvested and, on the other hand, the crop itself is reliably gripped and conveyed to the cutting mechanism by the chain type conveying means. Thus, all the conditions required for trouble-free and reliable working are present.

Conveniently, the guide members may be adjustably mounted on a carrier rail so as to form an assembly unit. Mounting this unit on a harvester combine and dismounting it therefrom according to actual requirements can be readily effected in each case in an easy manner and without any mechanical skill. Furthermore, the harvester combine on which the harvesting attachment is mounted may remain substantially unchanged with regard to its basic construction.

Expediently, at least one of the outer adjustable guide members may form a swath board which limits the effective width of the cutting mechanism to the adjusted width of the harvesting attachment. This feature is suited to ensure trouble-free operation as by adjusting the effective width of the cutting mechanism also the effective width of the entire header assembly of the harvester combine is adaptable to actual working conditions.

Adjustment of the guide members may be effected in various ways. So it is possible, for example, and generally the most expedient way to arrange the guide members so as to be shiftable parallel to the longitudinal axis of the cutting mechanism.

In addition thereto or instead thereof the guide members may include mounting frames which are rotatably adjustable about vertical driving shafts arranged for driving the chain type conveying means. This results in a wide range of adjustability and at the same time a particularly simple construction. Moreover, the operation of the chain type conveying means will not be affected by the various adjustments of the guide members.

In the case of the guide members being shiftable parallel to the longitudinal axis of the cutting mechanism, the driving means may include a shaft extending parallel to the cutting mechanism and arranged to drive the vertical driving shaft for the chain type conveying means, said shaft being adjustable with respect to its length by means of telescopically adjustable joints provided thereon between adjacent shiftable guide members.

It would, however, also be possible to provide a splined shaft or the like carrying the motion transmitting elements such as gear wheels which are operatively coupled and longitudinally slidable thereon and arranged on bearing blocks each carrying a guide member and adjustable to selectable longitudinal positions.

The proposed adjustability of the guide members ensures that the rows of the crop in each case will be received accurately in the middle portion of the stalk passages.

The efficiency of the proposed harvesting attachment resulting from the aforementioned features may still be improved by using a cutting mechanism consisting of a plurality of stationary knives and of a reciprocable cutter bar having knives which are longer than the stationary knives and project beyond the front edges thereof.

Experience has shown that such a cutting mechanism is capable of high performance and trouble-free operation as there is no danger that the usually very strong stalks of the crop first hit on stationary parts, such as projecting fingers of the cutting mechanism, before being gripped and cut by the reciprocating knives.

A preferred embodiment of the invention will now be described by way of example and with reference to the accompanying drawings, in which:

FIG. 3 is a perspective view on a larger scale of details of the corn stalk cutter;

FIG. 4 is a cross section along the line IV—IV of FIG. 5 through the cutter bar, on a larger scale, and FIG. 5 is a top plan view of the detail shown in FIG. 4.

Figure 1:
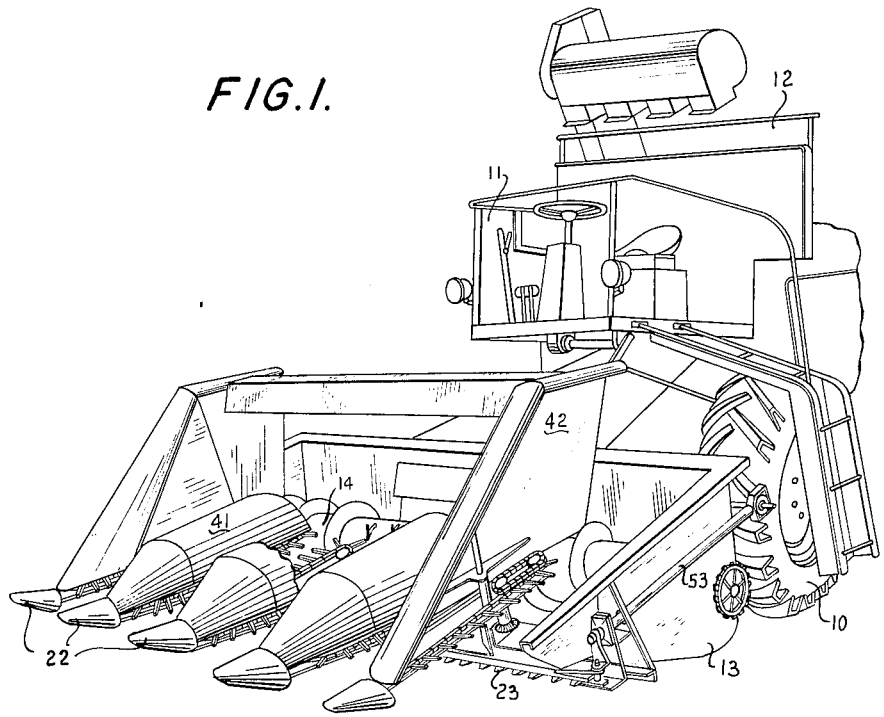
FIG. 1 is a perspective view of a corn stalk cutter mounted on a harvester combine.

FIG. 1 shows a harvester combine which is movable on wheels 10 and provided with a driver's platform 11 and a bagging platform 12. A pan 13 is arranged behind a cutting mechanism 23 and an auger feeder 14 is arranged to operate above the pan 13. As shown especially in FIG. 2, the end portions of the auger feeder 14 are provided with left and right hand helical fins 15, whereas the middle portion thereof carries a plurality of controlled fingers 16 for conveying both the cut crop which is directly fed to this portion by the movement of the harvester combine and the cut crop which is fed to this portion by the helical fins 15 in a known manner to an elevator from where it is fed to a threshing mechanism. For harvesting crop planted in relatively wide-spaced rows, such as Indian corn, a harvesting attachment for row-planted crop as proposed by the invention is detachably mounted on the pan 13 of the harvester combine. This harvesting attachment is designed for simultaneously harvesting four rows of crop and for this purpose is provided with pointed, elongated and longitudinally extending guide members 22 defining laterally four stalk passages 17, 18, 19 and 20 and projecting forwardly beyond the cutting mechanism 23. The guide members 22 are adjustable to the row spacing of the crop and provided with chain type conveying means 24 arranged to pass the crop through the stalk passages 17 to 20 toward the cutting mechanism 23 in such a manner that the runs of the chain type conveying means 24 which are within the stalk passages 17 to 20 will be moved in the direction opposite to the advancing direction of the harvester combine and at such a rate that fingers 21 provided on the chain type conveying means 24 have about zero speed in relation to the ground.

As the distances between adjacent rows of crop, such as corn, will vary according to soil and weather conditions, for example between 0.7 and 1.0 meter, provision is made for adjusting the spacing between the individual stalk passages 17, 18, 19 and 20 in correspondence with actual requirements, so that trouble-free operation is ensured, i.e. especially to prevent the danger of, for example, corn stalks being laterally bent over or even uprooted by the guide means before reaching the cutting mechanism 23. For this purpose the individual guide members 22 are arranged to be shiftable parallel to the longitudinal axis of the cutting mechanism 23, that is to say transversely to the advancing direction of the harvester combine and preferably also rotatably adjustable, as shown especially in FIG. 3. In some cases rotatable adjustability alone will suffice to meet practical requirements.

FIG. 3 shows a carrier rail 25 extending parallel to the cutting mechanism 23 and carrying longitudinally shiftable bearing blocks 26 which can be fixed in the respective selected longitudinal positions through the intermediary of clamping means 27 and 28 respectively passing through elongated slots 57 and 58. A shaft 29 co-extensive to the cutting mechanism 23 passes through the bases of all the bearing blocks 26. Between adjacent bearing blocks 26 the shaft 29 is provided with telescopically adjustable joints 30 adapted to follow the respective adjustment of the bearing blocks 26. A vertical driving shaft 31 mounted in each of the bearing blocks 26 and carrying a sprocket wheel 32 on its upper free end is arranged to be driven by the shaft 29 through the intermediary of bevel gears 60 and 61 respectively fixed to sections of the shaft 26 and to the vertical driving shafts 31. A driving chain 33, shown in FIG. 2, connects the sprocket wheel 32 with a sprocket wheel 34 which is rotatably mounted on a vertical pin 35 on a mounting frame 36 of the respective guide member 22. Sprocket wheels 38 and 39 rotatably mounted on vertical pins at the forward end of the mounting frame 36 and a sprocket wheel 37 entrainably coupled with the sprocket wheel 34 are provided for driving and guiding the chain type conveying means 24. The mounting frame 36 also is provided with a vertically extending holder 40 for mounting protective coverings 41 or 42, respectively, the lateral protective covering 42 forming a swath board limiting the effective width of the cutting mechanism 23.

Figure 2:
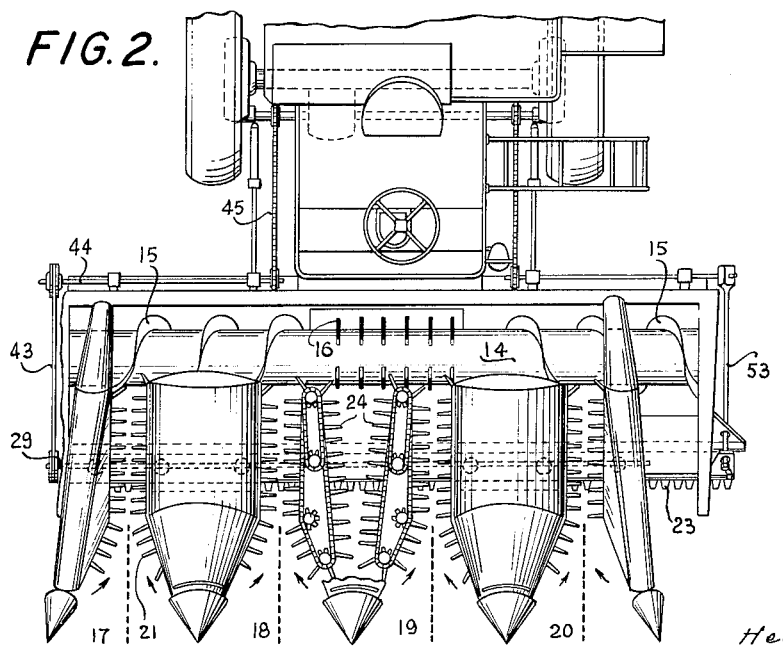
FIG. 2 is a top plan view thereof with some parts broken away.

As shown in FIG. 2, a shaft 44 is provided behind the pan 13 for driving the shaft 29 through the intermediary of a chain drive 43. This shaft 44 is coupled through the intermediary of a chain drive 45 to a driven shaft of the harvester combine, preferably, however, to one of the wheels 10 thereof, so that the running speed of the chain type conveying means 24 is directly controlled by and adapted to the advancing speed of the harvester combine.

As can be seen particularly from FIGS. 3 to 5, the cutting mechanism 23 of the harvesting attachment includes a plurality of stationary knives 50 and a laterally reciprocable cutter bar 51 having knives 52 which project to a small extent beyond the front edges of the cooperating stationary knives 50. A shaft 53 effects the reciprocating movement of the cutter bar 51 preferably through a wobble-plate drive and a lever, which are not shown.

From FIG. 3 it can also be seen that the upper portions of the bearing blocks 26 are rotatable in relation to the base portions thereof and fixable in the desired positions by means of screws 54 projecting through arcuate slots 55 in the upper portions of the bearing blocks 26. Rotational adjustment of the mounting frames 36 does not affect the drive of the chain type conveying means 24 as the centres of the vertical driving shafts 31 in each possible position of the mounting frames 36 correspond to the axes of rotation of the mounting frames 36.

By shifting the bearing blocks 26 transversely to the advancing direction of the harvester combine and by turning the mounting frames 31 about the longitudinal axis of the respective vertical driving shaft 31, the guide means, i.e. the guide members 22 and the chain type conveying means 24 and thus the stalk passages 17, 18, 19 and 20, are easily adaptable to the various row spacings of the crop so that trouble-free operation is ensured in all cases. By the constructional feature of the knives 52 on the cutter bar 51 projectng beyond the front edges of the stationary knives 50, reliable cutting even of very resistant stalks is ensured.

In some cases it will be sufficient to arrange the bearing blocks 26 so as to be shiftable only and to dispense with rotational adjustability, whereas in other cases it might be useful and sufficient to provide for the latter and dispense with the former feature.

I claim:
1. A harvester combine mounted harvesting attachment for row-planted crop, especially Indian corn, comprising, in combination, an elongated cutting mechanism extending transversely to the direction of movement of the combine; a carrier rail mounted on said combine substantially parallel to said cutting mechanism; a plurality of pairs of guide means extending spaced from each other substantially in direction of movement of the combine across the cutting mechanism and arranged to define between each pair of guide means a stalk passage converging in a direction opposite to the advancing direction of the combine, each of said guide means including a lower member, an upper member mounted on said lower member for limited turning movement relative thereto about a substantially vertical axis, an elongated guide frame extending transverse to said axis and fixed to said upper member for limited turning movement therewith; a guide member carried by said frame so that the angular positions of adjacent guide members may be adjusted relative to each other, and means for releasably locking said upper member in an adjusted turned position relative to said lower member; chain type conveying means mounted on each of said guide frame and cooperating with said guide member carried by said frame for conveying the cut crop beyond said cutting mechanism; means for adjustably mounting said lower member on said carrier rail movable in longitudinal direction thereof so as to adapt the positions of said guide members and said conveying means to the row spacing of the crop to be harvested; and drive means associated with said chain type conveying means and including telescoping drive shaft means extending parallel to said carrier rail and a plurality of vertical shafts, one for each guide means, and extending respectively along the respective vertical axis and being operatively connected to said shaft means for rotation therewith.

2. A harvesting attachment as claimed in claim 1, wherein at least one of the outer adjustable guide members forms a swath board which limits the effective width of the cutting mechanism to the adjusted width of the harvesting attachment.

3. A harvester combine mounted harvesting attachment for row-planted crop, especially Indian corn, comprising, in combination, an elongated cutting mechanism extending transversely to the direction of movement of the combine; a carrier rail mounted on said combine substantially parallel to said cutting mechanism; a plurality of pairs of guide means extending spaced from each other substantially in direction of movement of the combine across the cutting mechanism and arranged to define between each pair of guide means a stalk passage converging in a direction opposite to the advancing direction of the combine, each of said guide means including a lower bearing block member, an upper tubular member mounted on said lower member for limited turning movement relative thereto about a substantially vertical axis, an elongated guide frame extending transversely and to opposite sides of said axis and fixed to said upper member for limited turning movement therewith, a guide member carried by said frame so that the angular positions of adjacent guide members may be adjusted relative to each other, and means for releasably locking said upper member in an adjusted turned position relative to said lower member; chain type conveying means mounted on each of said guide frame and cooperating with said guide member carried by said frame for conveying the cut crop beyond said cutting mechanism; means for adjustably mounting said lower member on said carrier rail movable in longitudinal direction thereof so as to adapt the positions of said guide members and said conveying means to the row spacing of the crop to be harvested; and drive means for driving said chain type conveying means and including horizontal shaft means turnably mounted in said lower bearing block members and formed by a plurality of telescoping shaft sections connected to each other for simultaneous rotation so that the length of said shaft means may be adjusted during adjustment of the spacing between said bearing blocks, a plurality of vertical shafts respectively turnably mounted in said upper tubular members, cooperating gear means respectively fixed to said shaft sections and to said vertical shafts for rotating the latter during rotation of said shaft means, and sprocket and chain means mounted on said guide frame for transmitting a drive from said vertical shaft to said conveying means.

References Cited by the Examiner

UNITED STATES PATENTS

| 2,365,997 | 12/44 | Belfer | 56—119 |
| 2,737,770 | 3/56 | Wigham | 56—98 |
| 2,862,345 | 12/58 | Wigham | 56—98 |
| 3,098,338 | 7/63 | Myers | 56—296 |

FOREIGN PATENTS 1,232,842  10/60  France.

ABRAHAM G. STONE, *Primary Examiner.*

CARL W. ROBINSON, ARNOLD RUEGG, ANTONIO F. GUIDA, *Examiners.*